US005781769A

United States Patent [19]
Weber

[11] Patent Number: 5,781,769
[45] Date of Patent: Jul. 14, 1998

[54] METHOD AND APPARATUS FOR USING A CONTENT ADDRESSABLE MEMORY FOR TIME TAGGED EVENT PROCESSING

[75] Inventor: David M. Weber, Monument, Colo.

[73] Assignee: Symbios, Inc., Fort Collins, Colo.

[21] Appl. No.: 580,110

[22] Filed: Dec. 29, 1995

[51] Int. Cl.$^6$ .................................................. G06F 1/04
[52] U.S. Cl. ....................................... 395/557; 395/672
[58] Field of Search ................................. 395/672, 673, 395/677, 674, 670, 557

[56] References Cited

U.S. PATENT DOCUMENTS

| Re. 34,843 | 1/1995 | Ferguson | 360/5 |
|---|---|---|---|
| 4,040,034 | 8/1977 | Belady et al. | 364/200 |
| 4,279,015 | 7/1981 | Edelman et al. | 364/200 |
| 4,369,494 | 1/1983 | Bienvenu et al. | 395/551 |
| 4,432,051 | 2/1984 | Bagaert et al. | 395/704 |
| 5,063,523 | 11/1991 | Vrenjak | 395/200.53 |
| 5,197,115 | 3/1993 | Sueda et al. | 395/50 |
| 5,347,645 | 9/1994 | Perry | 395/550 |
| 5,491,815 | 2/1996 | Basso et al. | 395/557 |
| 5,691,917 | 11/1997 | Harrison | 364/514 |

OTHER PUBLICATIONS

"Priority-Based Parallel Architecture for Sensor Fusion", Kenji Nishida et al, Multisensor Fusion & Integration . . . Intelligent, Systems, 1994 Int'l Conf.

"Visual Basic 2.0," Simon, Barry, Windows Sources, Jul. 1993 V1 n6.

"Open VMS Kernds; Writing Correct Multithreaded Code", Hanrahan, Jamie Digital Systems Journal, Jul.–Aug. 1993, v15 n4.

"Event Identification in Hybrid Control Systems", M. D. Lemmon, Decision & Control, 1993 32nd Annual Conference.

"Accounting for Interrupt Handling Cost in Dynamic Priority", Real Time Systems, 1993 Symposium, Jetlay et al.

"A Decomposition Approach to Non-Preemptive Scheduling in Hard-Real-Time Systems", George Yuan, Department of Computer Science College Park, (1989).

"Timing Analysis for Fixed-Priority Scheduling of Hard-Real-Time Systems", Michael Gonzalez et al, IEEE Transactions on Software Engineering, 1994.

"Real-Time Software Testing for Microprocessor Based Protective Relays", N.I. Santoso, IEEE Transactions on Power Delivery, Jul. 1994.

Motorola Semiconductor Technical Data, MC10H155.

*Primary Examiner*—Majid A. Banankhan
*Attorney, Agent, or Firm*—Daniel N. Fishman; Wayne P. Bailey

[57] ABSTRACT

A method and associated apparatus for using a content addressable memory (CAM) to process timed events in a process control application. A time value field in each CAM entry identifies the time at which a corresponding event is to be processed. An event identifier field in each CAM entry identifies the event to be processed. A time value generator applies signals indicative of a time value to the CAM. The CAM returns as data on its output signal paths any entries whose time value fields correspond to the applied time value signals. The event identifier field applied to the output signal paths of the CAM is then applied to the process controller to identify an event to be processed. The methods and apparatus of the present invention are applicable, for example, in communication controller devices wherein a protocol requires timed event processing for standardized communications (e.g., Fibre Channel or FDDI). In addition, the apparatus and methods may be applied to computer controlled processes to relieve the CPU of the overhead processing burden of processing interrupts corresponding to "timer ticks" unrelated to any event. In addition, application of the present invention to computer process control applications (including operating system processing of timed events) relieves the CPU of the processing overhead associated with creating, searching, and maintaining list or queue data structures for the scheduled events.

15 Claims, 6 Drawing Sheets

METHOD AND APPARATUS FOR USING A CONTENT ADDRESSABLE MEMORY FOR TIME TAGGED EVENT PROCESSING

BACKGROUND OF THE INVENTION

1. Field of the Invention

The present invention relates to the time tagged event processing and in particular to the use of a content addressable memory device for determining events to be processed corresponding to a particular time tag.

2. Background of the Invention

It is common in many control applications to process control related events based upon timed events. In particular, in computer controlled processes, it is common for a software function to be invoked periodically in response to an interrupt signal such as from a timer peripheral component or chip. At each timer interrupt, a software interrupt service function would be invoked to process any timed events. Typical processing of such a timer interrupt service function would include incrementing a counter of the number of periodic invocations of the function to maintain a record of time since the start of the process. The incrementing counter is then compared to a list of timed events. Each timed event is typically defined by an entry in a table which identifies the event to be processed and the time at which the event's processing is to be invoked.

Such exemplary timed event processing can represent a significant overhead within the processing of the computing system in which it operates. For example, each such timer interrupt requires the processor of the computing system to switch context-saving context in response to the interrupt and restoring the saved context upon completion of the interrupt processing. If the frequency of the interrupts is high, as may be required for finer resolution of the timer counter increments, then the overhead processing of frequent context switching can be significant. This can degrade the performance of other processing within the computing system. In addition, if the number of events which may require timed processing is large, this too can increase the overhead processing of the computing system. Specifically, it is common software practice to maintain such timed events in a queue structure or other data structures which store entries describing the timed events. Each time the processor of the computing system is interrupted to process a timer interrupt (a "clock tick"), the queue or other data structure is searched to find any timed events which require processing at this time. Searching this list can be quite time consuming if the number of entries is large. This queue searching overhead processing can be reduced by maintaining the queue in a sorted order according to ascending time value of the events. However, maintaining the sorted order of the list adds additional overhead processing to the addition or deletion of entries in the queue.

For example, in high speed communication control applications such as FDDI or Fibre Channel, communication protocols and standards define one or more timeout parameters associated with the communication link. For example, there may be minimum times for delays before certain responses may be transmitted. Similarly, there may be maximum times during which certain transmissions are permitted or must be completed. Such timeout processing is typically performed using standard software event processing in a general purpose processor associated with the communications controller.

It is evident from the above discussion that a need exists for an improved method and apparatus for processing timed events, in particular in a computer controlled processing environment.

SUMMARY OF THE INVENTION

The present invention solves the above and other problems, thereby advancing the state of the useful arts, by providing a method and associated apparatus for processing timed events in a process control environment. In particular, the present invention provides for the use of a content addressable memory bank associated with the process controller (e.g., a computer system) for reducing the overhead processing within the process controller as compared to prior approaches. The process controller (computing system for example) stores entries in the content addressable memory (CAM) which each contain an identifier field for a particular event to be processed at a later time and which also contain a time value field indicative of the time at which the event is to be processed. A standard oscillator circuit is connected to a time base value generator (e.g., a counter with a divider circuit) to generate time values indicative of time since the start of processing. The time values generated by the time base value generator are applied as inputs to the CAM. The CAM generates as output signal values the event identifier field of any entries in the CAM for which the time value input is equal to the stored time value field. The output event identifier values are then applied as inputs to the process controller (e.g., computing system) to identify timed events which are to be processed by the process controller at the present time.

These circuits and methods of the present invention reduce the overhead processing imposed upon the process controller (computing system) by prior methods in two ways. First, the interrupt overhead processing may be reduced by the present invention by generating interrupts to the process controller only when a timed event is to be processed rather than for each count of the time base (i.e., each clock tick). Second, the overhead processing required of the process controller to create, search, and maintain queue data structures is eliminated. Events are "scheduled" by writing an entry to the CAM rather than adding an entry to a sorted queue. Similarly, events are found by a time base value generator circuit applying signals to the CAM rather than the process controller (computing system) searching for an entry in a queue data structure (sorted or otherwise).

Where multiple event entries in the CAM have the same time value field, methods of the present invention include the addition of a priority field to the entries in the CAM such that all events with the same time value are processed (by applying the event identifier value to the process controller) in order of the value in the priority fields of the respective entries.

It is therefore an object of the present invention to provide methods and associated apparatus for reducing overhead processing in a process controller related to timed event processing.

It is a further object of the present invention to provide methods and associated apparatus for using a content addressable memory for processing of timed events.

It is still a further object of the present invention to provide methods and associated apparatus for storing indicia of timed events in a content addressable memory and for retrieving the indicia of timed events by a process controller to minimize overhead processing relating to the timed events.

It is yet another object of the present invention to provide methods and apparatus for processing timed events by a process controller without creating, searching, or maintaining a timed event queue in the process controller.

The above and other objects, aspects, features, and advantages of the present invention will become apparent from the following description and the attached drawing.

DETAILED DESCRIPTION OF THE INVENTION

Figure 1:
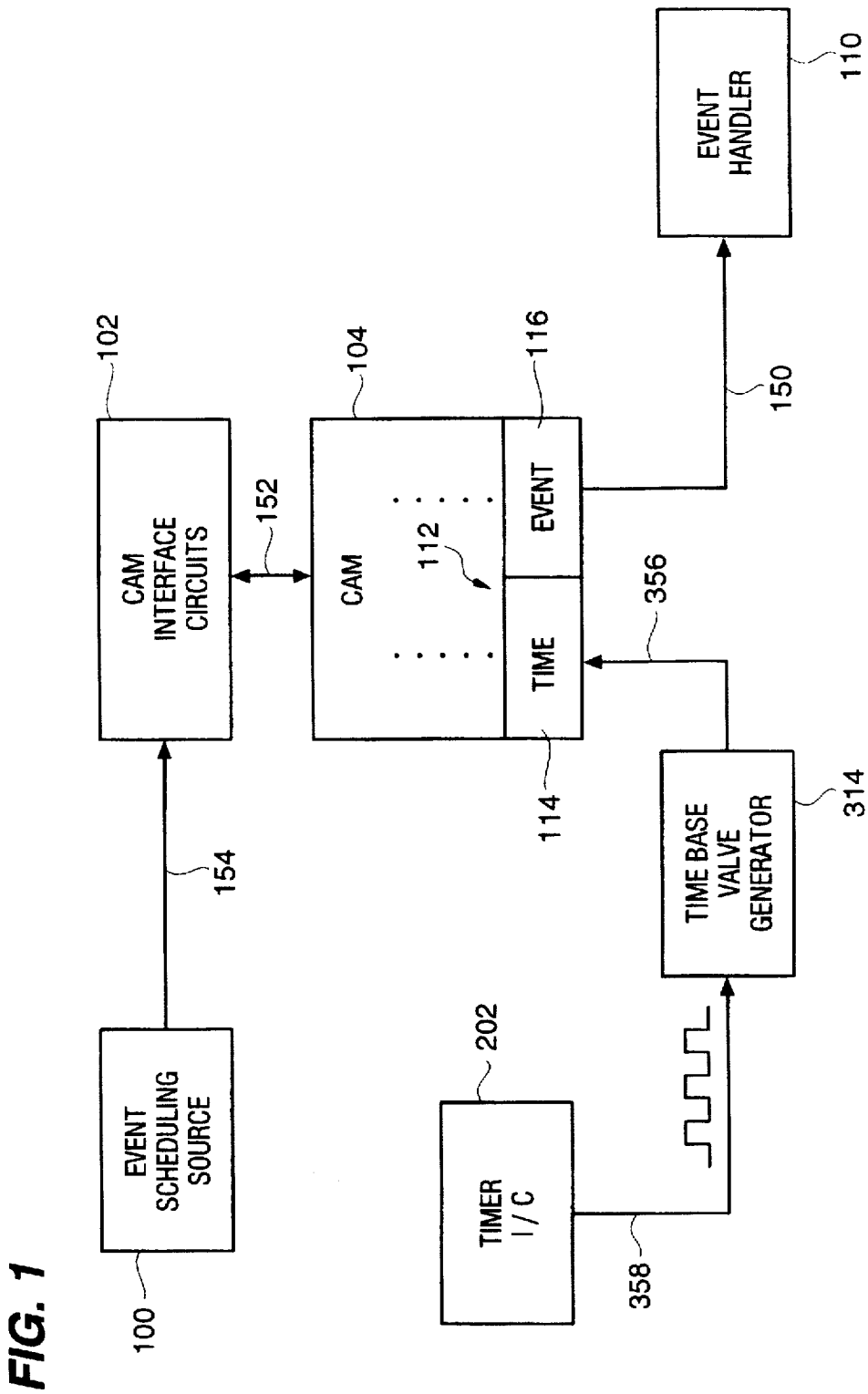
FIG. 1 is a block diagram depicting a process control application utilizing the methods and apparatus of the present invention for processing of timed events.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

PRIOR DESIGN TIMED EVENT HANDLING EXAMPLE

Figure 2:
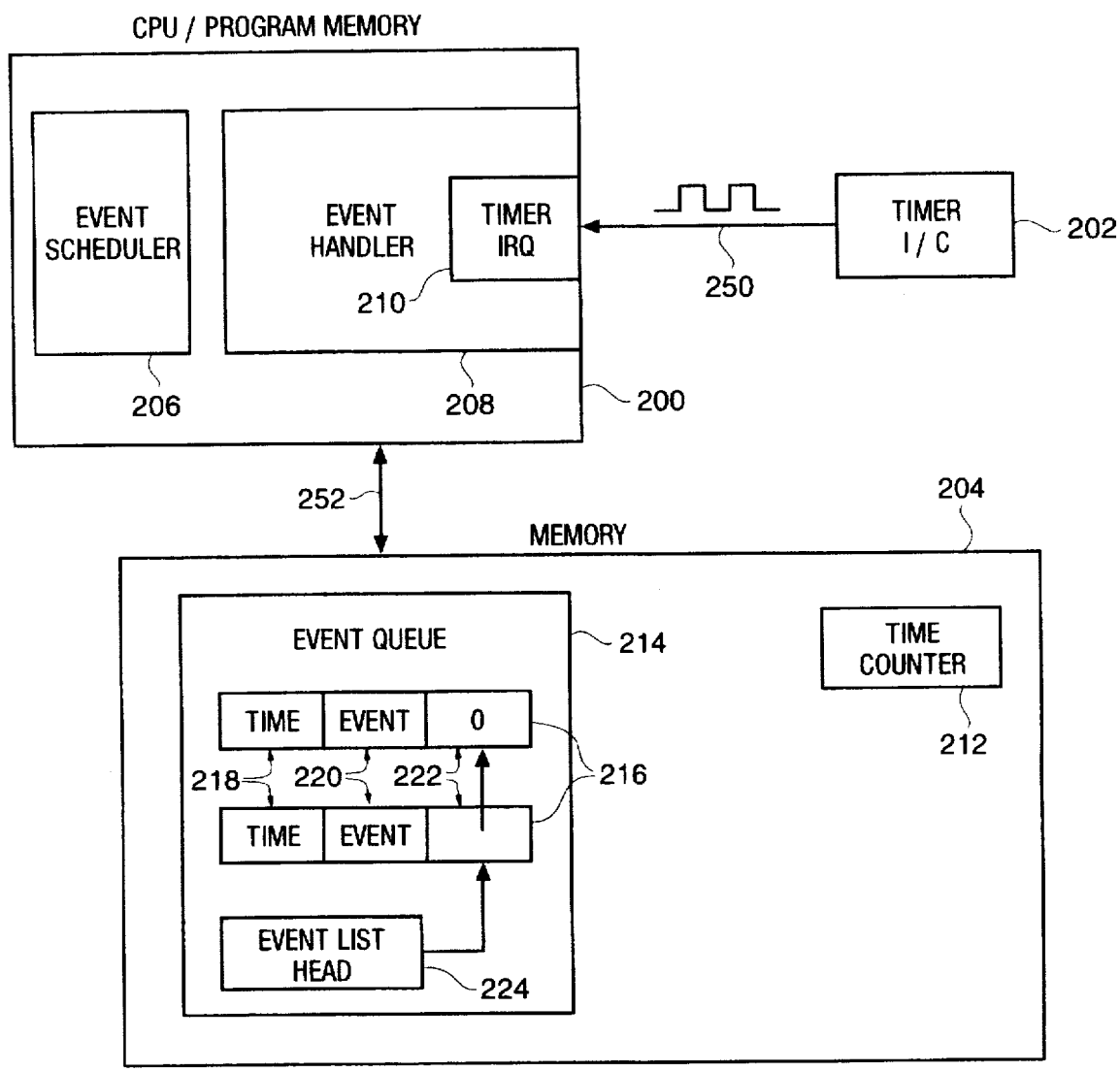
FIG. 2 is a block diagram depicting a computer operable process control application as known in the art devoid of the improvements of the present invention.

FIG. 2 depicts a typical process control application as is known in the art wherein CPU/program memory 200 processes timed events retrieved from a memory 204. CPU/program memory 200 is a representation of a combination of a CPU and its associated program memory storage (whether RAM or ROM). The actual physical configuration of the CPU and its program memory, within a single chip or in a plurality of components, is not relevant to the presentation of the prior art methods. CPU/program memory 200 is connected to a memory 204 via bus 252 for storage of data and variables associated with the processing of timed events. As above, the physical representation of the CPU and the memory as distinct components or as a single integrated circuit is not relevant to the present discussion. Each timed event is represented by an entry 216 in an event queue 214 stored in memory 204. The first entry in the event queue 214 is pointed to by the event list head 224 pointer variable. Each subsequent entry 216 is linked to the subsequent entry by link field 222 in a singly (or doubly) linked list data structure as is known in the art.

A timer circuit 202 generates a fixed frequency oscillating signal on bus 250. The signal is applied to CPU/program memory 200 as an interrupting signal which forces the CPU to switch its current processing to an appropriate context for processing the fixed frequency oscillating signal. Typically, each pulse received by the CPU causes a timer interrupt (IRQ) service routine 210 to increment a time counter 212 variable in memory 204. The time counter 212 represents the number of pulses (analogous to ticks of a clock) since the CPU began processing the timer pulse signals. The time counter 212 therefore is indicative of the elapsed time since processing began by the CPU.

At each timer signal pulse ("clock tick"), the IRQ service routine 210 invokes related processing to check for any timed events which are to be processed at the present elapsed time value. Specifically, event handler 208 compares the time counter 212 value to the time field 218 value of each entry 216 in the queue 214 of memory 204. For each entry in which the time field 218 is less than or equal to the present time value in time counter 212, an event identified by the event ID field 220 of the entry 216 is said to be "triggered." Each triggered event is then processed by appropriate processing within event handler 210. One of ordinary skill in the art will readily recognize several variants of this structure and method such as testing for absolute equality of the time counter 212 and the time field 218 of each entry. Additionally, the CPU processing required to search the event queue 214 at each timer tick may be reduced by maintaining the list in sorted order by ascending time field 216 values. However, even considering such variants and modifications, the processing required of CPU/program memory 200 to process timed events in this manner can be quite significant. The overhead processing includes context switching to save and restore the context of the operating CPU at each timer pulse signal interrupt (IRQ) and the processing at each timer interrupt to search the event queue 214 to identify triggered events.

As described above, the contents of event queue 214 in memory 204 may be either static or dynamic. For example, the event queue 214 could be encoded in a ROM device or could be dynamically programmed with new event entries as they are required. Event scheduler 206 is operable within CPU/program memory 200 to generate new event entries 216 and to add them to the event queue 214 as required by processing of the CPU. For example, a recurring event (e.g., an event to be processed every N ticks) may be implemented by adding an event entry 216 to the queue 214, processing the event, removing the entry 216 just processed from the queue 214, and adding a new entry 216 to the queue 214 for N ticks later in elapsed time. Managing the queue 214 to perform this list processing can burden the CPU with additional overhead to add and remove entries from the queue while (potentially) maintaining a sorted order. Clearly as the number of events increases and as the frequency of the event triggering increases, the overhead processing by the CPU can be significant.

IMPROVED TIMED EVENT HANDLING OF PRESENT INVENTION

Figure 3:
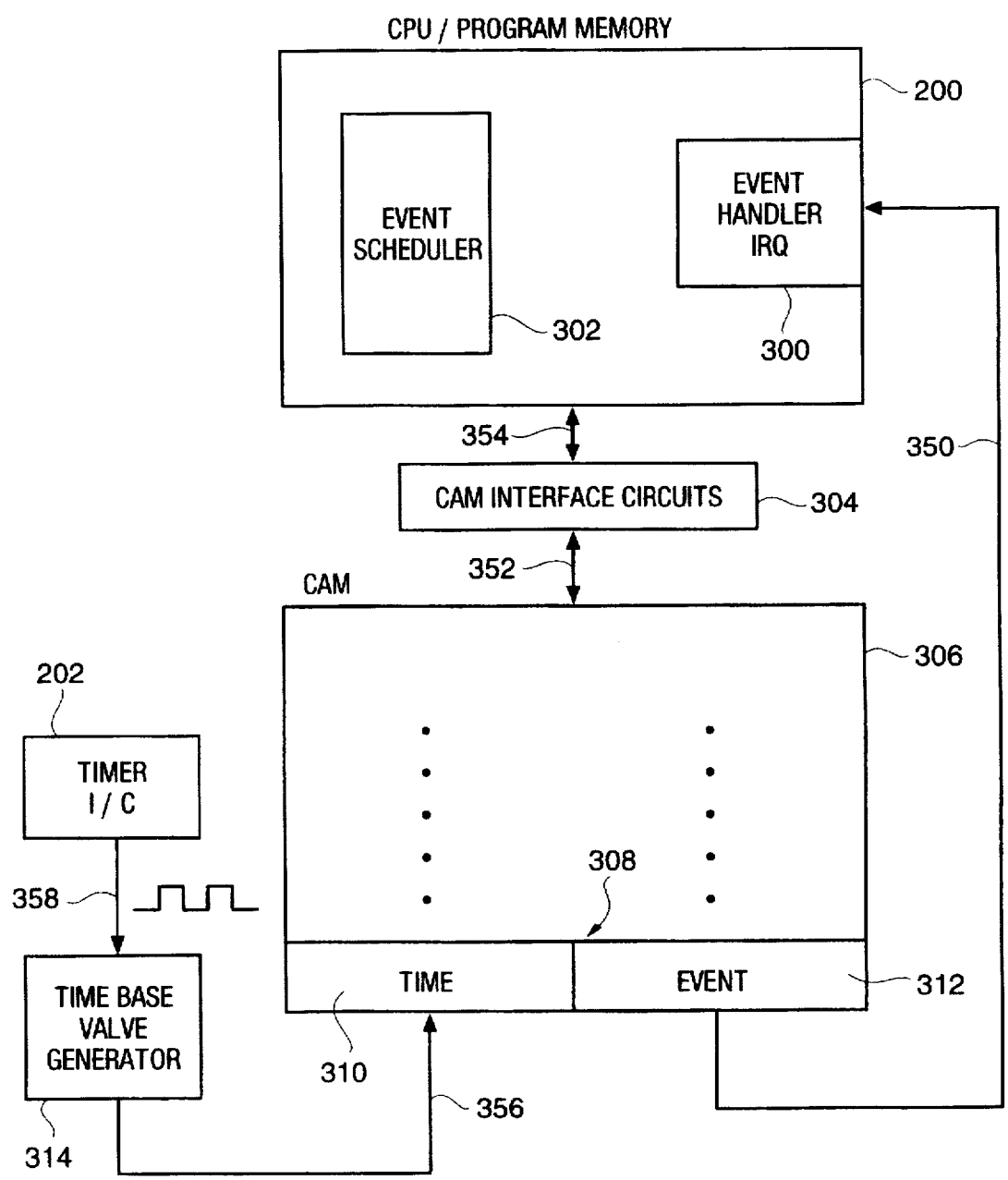
FIG. 3 is a block diagram depicting a computer related process control application utilizing the methods and apparatus of the present invention for processing of timed events.

FIG. 3 depicts a process control event processing application improved by the apparatus and methods of the present invention. CPU/program memory 200 of FIG. 3 no longer receives direct timer signal pulses required for processing timed events. Rather, events which are identified as triggered by external processing (discussed below) are applied to the CPU over bus 350. The application of a triggered event identifier to bus 350 generates an interrupt within CPU/program memory 200. The interrupt (one per triggered event rather than one interrupt per timer tick) is then processed by an event handler interrupt service function 300 to perform other related processing appropriate to the identified triggered event.

In the improved structure and methods of the present invention, events are recognized as triggered by content addressable memory 306 (CAM) and associated circuits and methods without the overhead processing by the CPU required of past methods (as in FIG. 2). CAM 306 contains an entry 308 for each event to be processed. Each entry 308 includes a time field 310 identifying the time at which the corresponding event is to be processed and an event identifier field 312 which identifies the event to be processed at that time. Unlike traditional memory devices which store and retrieve information at a particular linear address provided by the device which uses the memory (such as memory 204 of FIG. 2 as known in the art), the CAM 306 of FIG. 3 stores and retrieves an entry at a location determined by the content of the data in the entry. Specifically, CAM 306 stores and retrieves each entry 308 at a location which corresponds to the value of the time field 310 of the entry 308. Such content addressable memory devices are known to the art as, for example, the Motorola MC10H155 Content Addressable Memory device (and other similar devices from other manufacturers). One of ordinary skill in the art will readily recognize that a plurality of such CAM devices may be used to create a bank of any desired word (entry) width.

CAM interface circuits 304 are representative of the standard "glue" logic required to permit the CAM 306 to communicate with CPU/program memory 200 and to control the comparison modes of the CAM 306 (i.e., the CAM may be controlled to compare for equality of a value and a stored value or for other boolean comparisons such as less than, greater-than, etc.).

Timer integrated circuit 202 generates an oscillating[]pulse signal of a fixed frequency and applies the signal to time base value generator 314 over bus 358. Time base value generator 314 accepts the pulsed timer circuit signal and generates a binary value representative of the elapsed time since processing began. One of ordinary skill in the art will readily recognize that time base value generator 314 may be implemented as a simple counter circuit with or without divider circuits to decimate the pulsed timer signal. The binary elapsed time values generated by time base value generator 314 are applied periodically (as generated) as inputs to CAM 306 over bus 356. The time values so applied to CAM 306 are used within CAM 306 to locate entries 308 which have comparable time field 310 values. The binary time values generated by time base value generator 314 are therefore referred to herein as comparison time values.

CAM 306 locates all (if any) entries which have time field values comparable with the comparison time value received at CAM 306 via bus 356 from time base value generator 314. As noted above, by appropriate control of the mode of operation of CAM 306 by CAM interface circuits 304, the time value may be compared for equality, greater than or equal, less than or equal, etc. The desired mode of comparison determines the operation of CAM 306 to locate entries 308 whose content (time field 310 value) compares favorably with the input comparison time values.

An event entry 308 (if any) located within CAM 306 by virtue of its time field 310 contents matching the comparison time value applied to the CAM 306 input is said to be "triggered" indicating the corresponding event is to be processed at the present time. The event ID field 312 of the triggered event entry 308 is then applied to the output of CAM 306, over bus 350, to an interrupt input (IRQ) of CPU/program memory 200. As noted above, the CPU then processes the event interrupt by performing processing appropriate to the event identified on its interrupt input signals (bus 350).

PRIORITIZED TIMED EVENT HANDLING

In its simplest design, CAM 306 and associated CAM interface circuits 304 are operable to locate a single triggered entry 308 corresponding to the comparison time value applied to its input over bus 356. In an alternate, preferred embodiment, time field 310 values of each entry 308 may include additional bits which define a priority among otherwise equal time field 310 values. For example, a three bit priority field may be used to uniquely identify up to eight entries having otherwise equal time field 310 values. The comparison time values generated by time base value generator 314 are devoid of the priority bits corresponding to the time field 310 and therefore identifies up to eight matching entries 308. Logic within CAM interface circuits 304 may then sequence through each of the up to eight entries 308 in CAM 306 which correspond to the present comparison time value. The entries may be located (i.e., triggered) in order of their respective priority bit field values.

Figure 6:
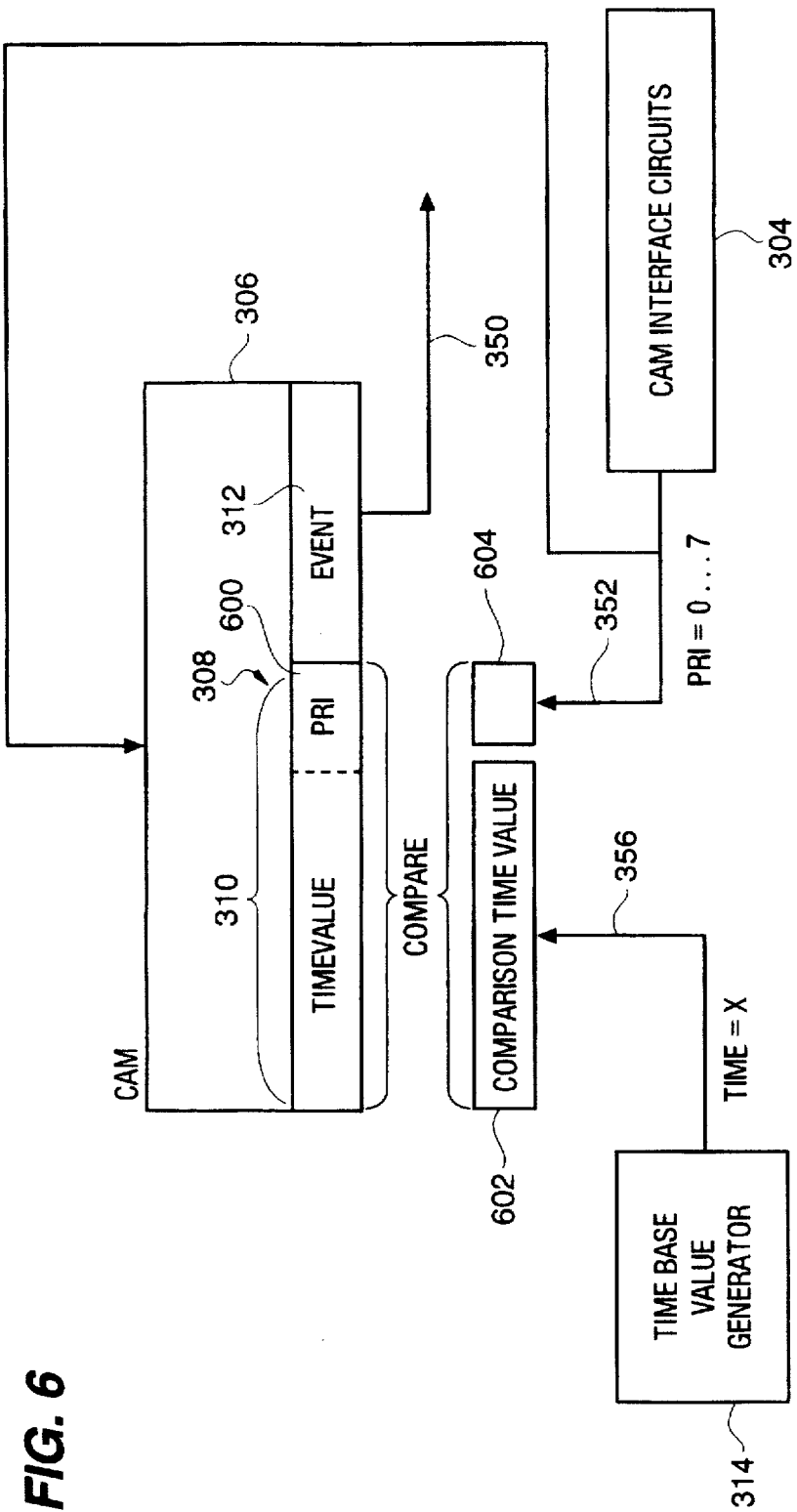
FIG. 6 is a block diagram depicting additional detail of the methods and apparatus of the present invention as related to processing of multiple timed events triggered at the same time.

FIG. 6 depicts additional details regarding the combination of the comparison time value 602 generated by time base value generator 314 and the sequence of priority values appended to the comparison time values as a priority field 604 by CAM interface circuits 304. The combined comparison time value 602 and sequenced priority values 604 are used to locate entries 308 having a time field value 310 (including a priority field value 600) which compare favorably with the combined (according to the current comparison mode controls discussed above with respect to CAM interface circuits 304). For each comparison time value 602 generated (as indicated by the label TIME=X on bus 356), each priority value is generated sequence in comparison priority value 604 (as indicated by the label PRI=0,1,2,3,4, 5,6,7 on bus 352). The event ID field 312 of each event so located by the comparison of the combined comparison values (602 and 604) with each entry's time field 310 (including the priority field value 600 portion of time field 310) is then applied to bus 350 for processing of the triggered event by the CPU.

As discussed above with respect to the event queue 214 of FIG. 2, the timed event entries 308 in CAM 306 may be statically written into the CAM (as in ROM devices) or may be dynamically written to the CAM 306 by an event scheduler 302 operable within CPU/program memory 200 of FIG. 3. However, the methods and structure of the present invention using CAM 306 for processing of timed events reduces the overhead processing imposed upon the CPU to manage the timed event entries. Rather than maintaining a queue in sorted order by use of complex data structures, the inherent functionality of CAM 306 maintains the relationship between a timed event entry and the scheduled time value for processing the event. The event is stored and retrieved by the content of the time value field 310 of the timed event entry 308. No overhead is imposed upon the CPU to maintain data structures for the timed events. The timed event entries 308 are built by the event scheduler 302 by concatenating the data for the various fields and applying the constructed entry to CAM 306 via busses 354 and 352 and CAM interface circuits 304.

GENERAL PROCESS CONTROL IMPROVED TIMED EVENT HANDLING

FIG. 1 is a block diagram of a more general description of the present invention. As is known in the art, process control applications need not necessarily incorporate general purpose computing devices. Rather, it is common in process control applications, including those which process timed events, to perform all processing with dedicated, discrete circuits, with analog/digital hybrid circuits, and with other processing devices other than general purpose computing devices. Communication controllers are exemplary of such specialized processing components which utilize timed event processing to control the timing requirements of their particular communication protocols and standards.

FIG. 1 shows such a generalized process control application in which the methods and apparatus of the present invention are applied. The process controller depicted in FIG. 1 may, for example, represent a Fibre Channel or FDDI communication controller in which packet oriented communications require implementation of timed event processing to manage timed aspects of the Fibre Channel or FDDI communication protocols.

Specifically, CAM 104 of FIG. 1 contains timed event entries 112 each including a time value field 114 indicative of the elapsed time at which a corresponding event is to be processed and an event ID field 116 identifying the event to be processed at the corresponding time. Timer IC 202 and time base generator are operable as described above with respect to FIGS. 2 and 3 to generate comparison time values for locating triggered timed event entries 112 in CAM 104.

The event ID field 116 value of triggered timed event entries 112 is applied to event handler 110 over bus 150. Event handler 110 may be any application specific device which performs appropriate actions in response to the triggering of the identified event. Event handler 110 is intended to be any process controller device including, but not limited to, general purpose computing devices programmed to process timed events. Exemplary of other process controllers as used herein are: display devices which display information in response to triggering of a timed event, actuators which control process components to alter the state of a controlled process, etc. All such event handlers are to be considered equivalent with regard to application of the CAM 104 as claimed by the present invention.

As discussed above with respect to FIG. 3, timed event entries 112 in CAM 104 may be statically encoded within CAM 104 or may be dynamically added and removed from CAM 104 by operation of event scheduling source 100 via busses 154 and 152 and CAM interface circuits 102. Event scheduling source 100 may be any application specific device including discrete logic circuits and, as in FIG. 3, a general purpose computing device.

METHODS OF THE PRESENT INVENTION

Figure 4:
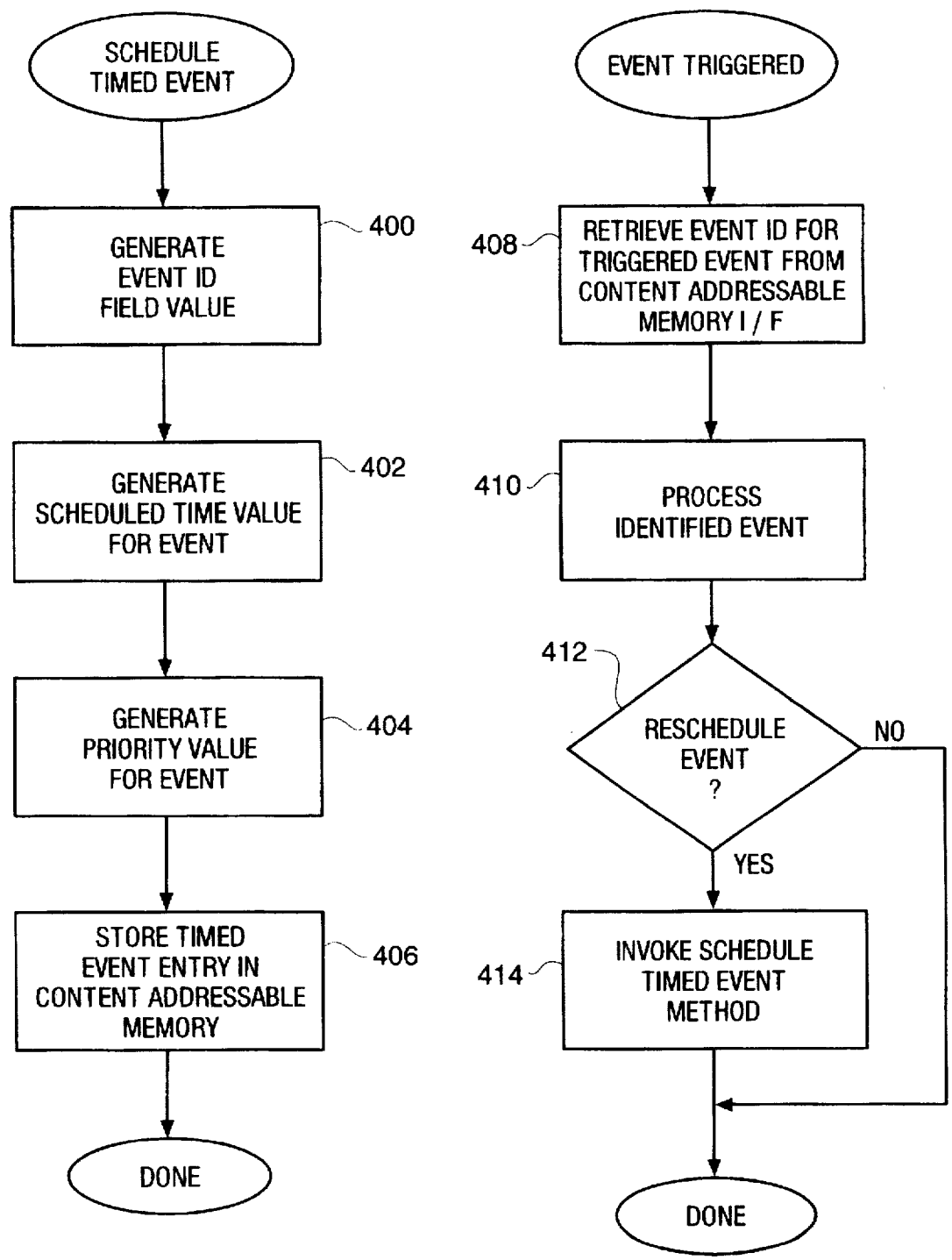
FIG. 4 is two flowcharts describing the methods of the present invention for scheduling timed events and for processing a triggered, timed event.
Figure 5:
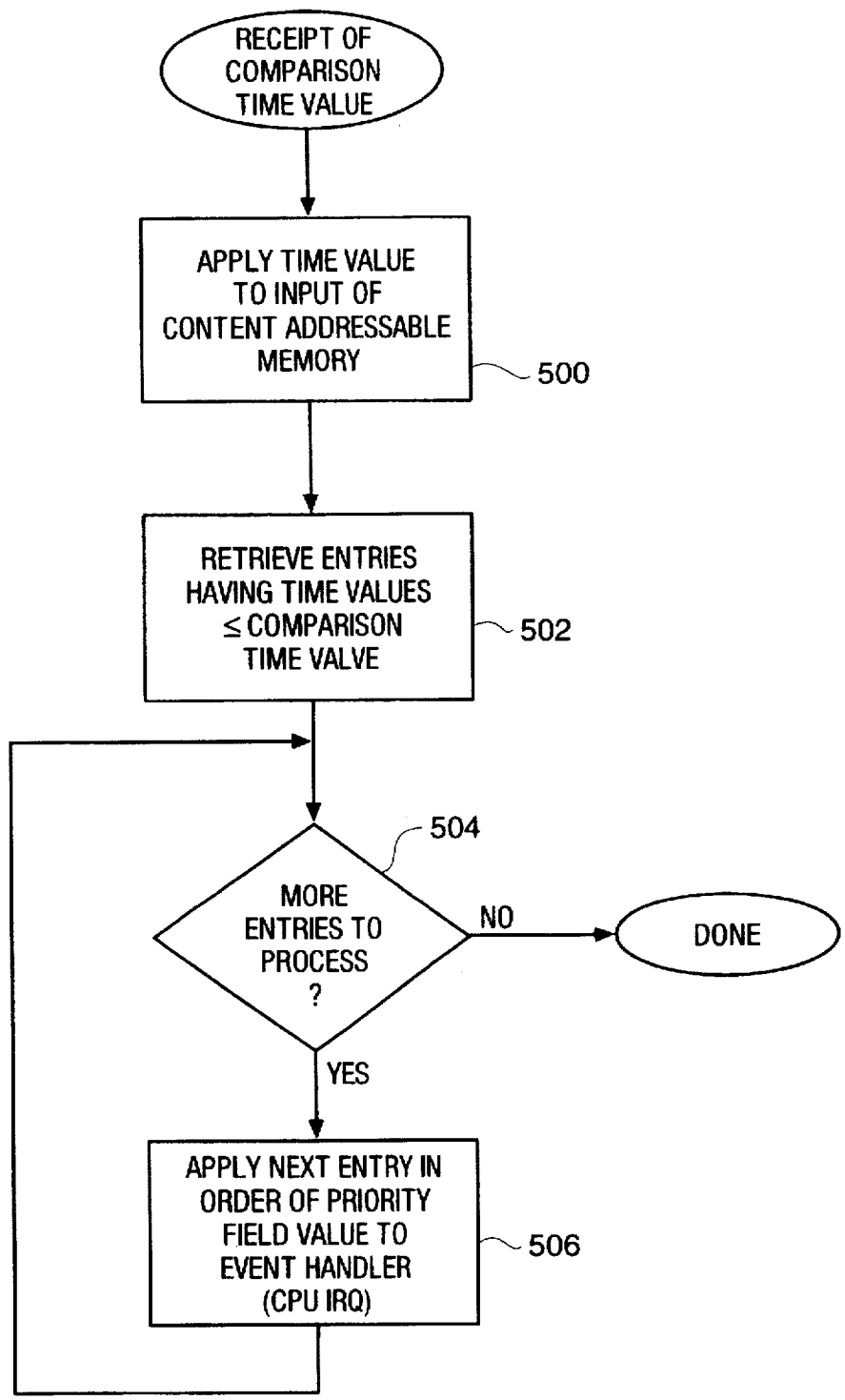
FIG. 5 is a flowchart describing the methods of the present invention which locate timed events in a content addressable memory device for further processing by an event handler.

FIGS. 4 and 5 are flowcharts describing the methods of the present invention operable within the apparatus depicted in FIGS. 1 and 3 as discussed above. FIG. 4 provides two flowcharts describing the methods of the present invention operable to store and retrieve timed event entries in a content addressable memory. The methods of FIG. 4 are operable within the apparatus depicted in FIG. 3 (i.e., a programmed general purpose computer with an associated CAM) or within the generalized process controller of FIG. 1 (an event scheduler source device and an event handler device associated with a CAM).

Elements 400–406 of FIG. 4 are operable to generate timed event entries for storage in an associated CAM. As discussed above, the methods and apparatus of the present invention may be utilized in conjunction with static contents of a content addressable memory. Such static content CAM applications may involve a process with fixed timing requirements. Elements 400–406 are useful in a control environment in which timed events are created dynamically as side effects of other actions in the controlled environment (i.e., tasks operating within a computer operating system).

Elements 400, 402, and 404 are operable in sequence to generate the timed event entry contents for the desired timed event. Each timed event entry includes an event identifier field (an event ID which uniquely identifies the event to be processed at a later time) generated by operation of element 400 and a time value field (indicative of the elapsed time at which the event is to be processed) concatenated to the event identifier field. As noted above, a timed event entry may optionally include a priority value field to uniquely identify distinct events scheduled for processing at the same time. The priority field, if any, is concatenated to the timed event entry by operation of element 404. The priority value field is conceptually an extension of the time value field. As discussed above however, the comparison time value generated by a time base value generator and an automatically sequencing priority comparison value is generated by control "glue" logic circuits associated with the CAM for purposes of locating the associated timed event entries stored in the CAM. One of ordinary skill in the art will readily recognize that a number of additional fields may be concatenated to the timed event entry limited only by the word width of the CAM. Additional fields may include, for example, parameters to be used when the identified event is processed by the event handler. Such additional fields are intended to be encompassed by the present invention in use of the term "event identification field." All parameters and values which are required by the event handler to perform the processing of the identified event are part of the event identifier field as used herein.

The timed event entry generated by operation of elements 400–404 is then applied to the CAM by operation of element 406 for storage. As is implicit in the operation of a CAM, the contents of the timed event entry (specifically the time value field concatenated with the priority field if any) are used by the CAM to determine the location for storage of the entry and, conversely, for retrieval of the entry.

The flowchart represented by elements 408–414 of FIG. 4 describes the method of the present invention operable to process a triggered event retrieved from the CAM by operation of a time base value generator as described above with respect to FIGS. 1 and 3. An event is said to be "triggered" when the generated comparison time value applied to the input of the CAM compares favorably with the timed event entry previously stored in the CAM. As discussed above, dependent upon control signals applied to the CAM, the comparison time value and the stored time value field of an entry may be compared for equality as well as other comparisons including less than or equal to and greater than or equal to. The event ID from the event identification field of a triggered event is applied to the event handler for processing as depicted by elements 408–414 of FIG. 4.

Element 408 is operable within the event handler to retrieve the event ID value from the triggered event identification field as applied to the event handler. Element 410 is then operable to process the identified event. Processing of the event is dependent upon the event identified and any parameters associated therewith. As noted above, the event identification field is used herein to represent all parameters needed to identify the particular processing required for the triggered timed event.

As discussed earlier, timed events in the CAM may be statically encoded and stored therein or may be dynamically generated as discussed with respect to elements 400–406. A common function following processing of a triggered event is to reschedule a recurring event (i.e., a periodically repeated timed event). Element 412 is operable to determine whether the specific event just processed is a recurring event (as determined by the semantic meaning of the event and any parameters in the processing thereof). If element 412 determines that the event is recurring in nature, then element 414 is next operable to reschedule the timed event. Element 414 is operable in a manner similar to that of elements 400–406 discussed above. The timed event entry just processed is removed from the CAM and a new timed event entry, incrementing the time value field, is generated and applied to the CAM for storage.

FIG. 5 is a flowchart describing the processing performed by the CAM to locate triggered timed events responsive to receipt of a comparison time value from the time base value generator. More precisely, the method depicted in FIG. 5 is performed by the CAM memory components per se and by associated control "glue" logic interfacing the CAM to other control elements as depicted in FIGS. 1 and 3. Element 500 is first operable in response to receipt of a comparison time value to apply the comparison time value to the inputs of the CAM. Element 502 is then operable implicitly within the CAM to retrieve any triggered timed event entries stored in the CAM. Specifically, any events stored in the CAM which compare favorably with the applied comparison time value are retrieved by operation of element 502. As discussed above, dependent upon the mode controls asserted by the "glue" logic circuits associated with the CAM, the comparison time value serves to trigger any events whose time value fields are equal to, less than or equal, greater than or equal, etc. One of ordinary skill in the art will readily recognize that the mode controls of the CAM circuits may be configured to permit many such numeric comparisons. Elements 504 and 506 are then operable repetitively to process each (if any) of the triggered timed events located by comparison with the applied comparison time value. In particular, element 504 determines whether additional triggered entries remain to be processed by element 506. Element 506 is operable for each triggered timed event to apply the event identification field value in the triggered timed event entry through the CAM output bus to the event handler device.

As discussed above, a priority value field appended to the time value field of each timed event entry serves to distinguish multiple timed event entries triggered by the same comparison time value. The "glue" control logic of the CAM sequences through each possible priority value for each applied comparison time value to locate each triggered entry with a unique priority value field and a time value field favorably comparable to the comparison time value. Elements 502–506 of FIG. 5 are descriptive of this process in terms of a more general method encompassed by the present invention as well as the detailed structure described above with respect to FIGS. 1 and 3.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An apparatus for processing timed events comprising:

a content addressable memory device for storing timed event entries, said timed event entries having an event identification field to identify an event to be processed and a corresponding time value field indicating a time value at which time said event is to be processed;

time value generation means, having an output signal path connected to the input signal path of said content addressable memory, for periodically generating comparison time values and applying said comparison time values as input signals to said content addressable memory; and event handler means, having an input signal path connected to the output signal path of said content addressable memory, for processing the event identification values received from said content addressable memory responsive to application of said comparison time values.

2. The apparatus of claim 1 further comprising:

event source means for generating an event identifier value and a corresponding time value; and means for applying the generated event identifier value and the generated corresponding time value to an input signal path of said content addressable memory for storage in an entry in said content addressable memory.

3. The apparatus of claim 2 wherein the event source means is a computer programmed for generating timed event entries for storage in said content addressable memory.

4. The apparatus of claim 1 wherein said entries in said content addressable memory include a priority field value to distinguish each entry from others of said entries having an equivalent time value field.

5. The apparatus of claim 4 wherein said content addressable memory further includes:

means for determining that a plurality of timed event entries have time value fields comparable to said comparison time values; and means for applying the event identification field of said plurality of timed event entries to said output path of said content addressable memory in order of said priority field value of said plurality of timed event entries.

6. An apparatus in a computer system for processing timed events comprising:

a content addressable memory device associated with a processor of said computer system for storing timed event entries, said timed event entries having an event identification field to identify an event to be processed and a corresponding time value field indicating a time value at which time said event is to be processed, wherein said content addressable memory is operable to receive a comparison time value on its input signal path, and wherein said content addressable memory is operable to locate triggered entries in said content addressable memory for which the time value field of said triggered entry is comparable to said comparison time value, and wherein said content addressable memory is operable to apply the event identification field value of the located triggered entries to its output signal path;

time value generation means, having an output signal path connected to the input signal path of said content addressable memory, for periodically generating said comparison time values and applying said generated comparison time values as input signals to said content addressable memory; and event handler means within the processor of said computer system, connected to the output signal path of said content addressable memory, for processing the event identification values received from said content addressable memory.

7. The apparatus of claim 6 further comprising:

event source means for generating an event identifier value and a corresponding time value; and means for applying the generated event identifier value and the generated corresponding time value to an input signal path of said content addressable memory for storage in an entry in said content addressable memory.

8. The apparatus of claim 7 wherein the event source means is a computer programmed for generating timed event entries for storage in said content addressable memory.

9. The apparatus of claim 6 wherein said entries in said content addressable memory include a priority field value to distinguish each entry from others of said entries having an equivalent time value field.

10. The apparatus of claim 9 wherein said content addressable memory further includes:

means for determining that a plurality of timed event entries have time value fields comparable to said comparison time values; and means for applying the event identification field of said plurality of timed event entries to said output path of said content addressable memory in order of said priority field value of said plurality of timed event entries.

11. In a process controller, a method for processing timed events comprising the steps of:

generating comparison time values;

applying said comparison time values to a content addressable memory, wherein said content addressable memory contains at least one timed event entry having a time value field indicative of the time value at which a corresponding event is to be processed and having an event identification field indicative of the event to be processed at the corresponding time value;

receiving a signal indicative of the event identification field value of a timed event entry from said content addressable memory when the time value field of said timed event entry is comparable to said comparison time value; and processing the event identified by the event identification field value received from said content addressable memory.

12. The method of claim 11 further comprising the steps of:

generating an event identifier value and a corresponding time value; and applying the generated event identifier value and the generated corresponding time value to an input signal path of said content addressable memory for storage in an entry in said content addressable memory.

13. The apparatus of claim 11 wherein said at least one timed event entry in said content addressable memory includes a priority field value to distinguish each entry from others of said entries having an equivalent time value field.

14. The apparatus of claim 13 further comprising the steps of:

determining that a plurality of timed event entries have time value fields comparable to said comparison time values; and applying the event identification field of said plurality of timed event entries to said output path of said content addressable memory in order of said priority field value of said plurality of timed event entries.

15. A general purpose computer connected to a content addressable memory programmed to process timed events according to any of methods 11 through 14.

* * * * *